United States Patent Office 2,842,240
Patented July 8, 1958

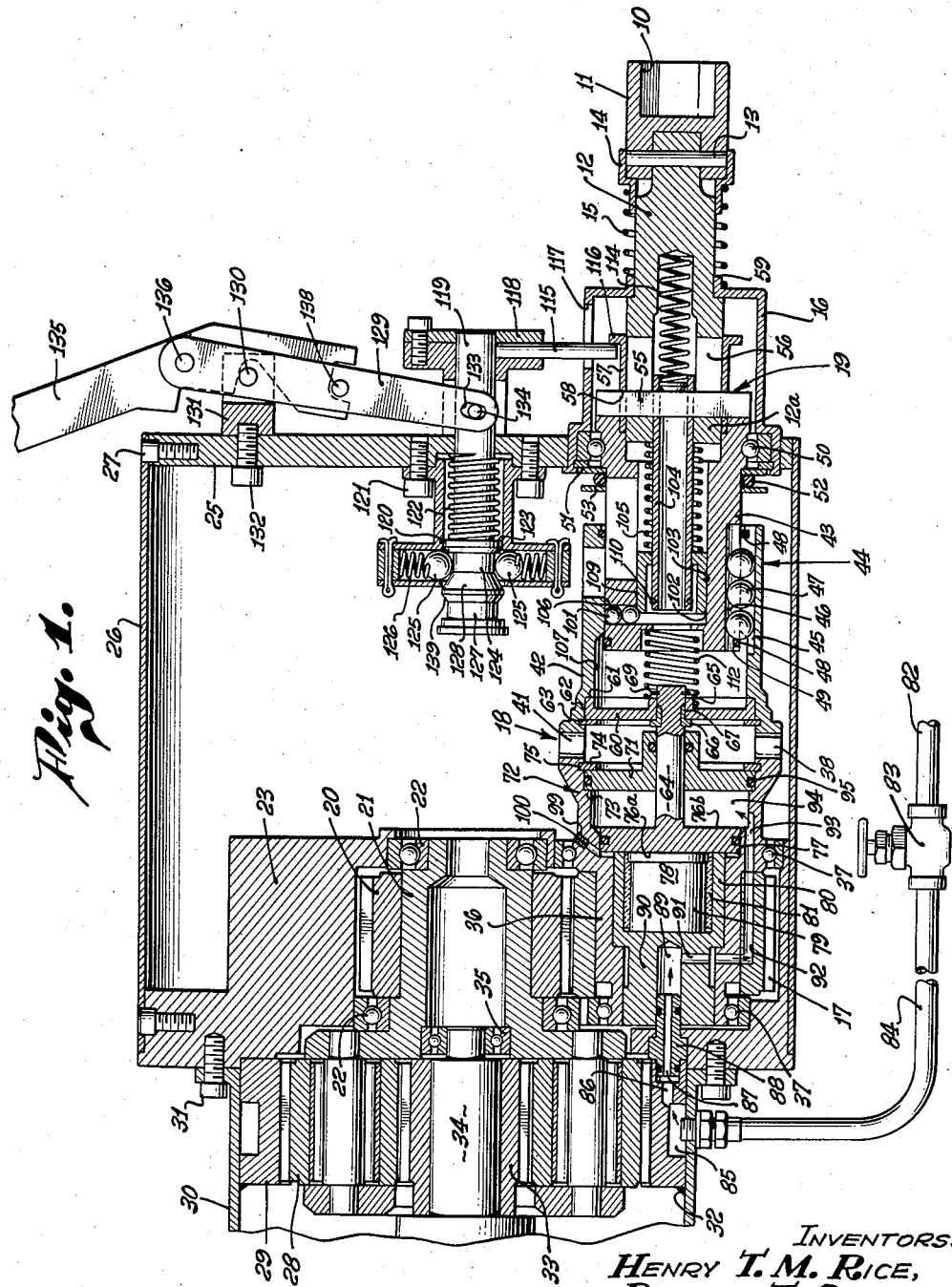

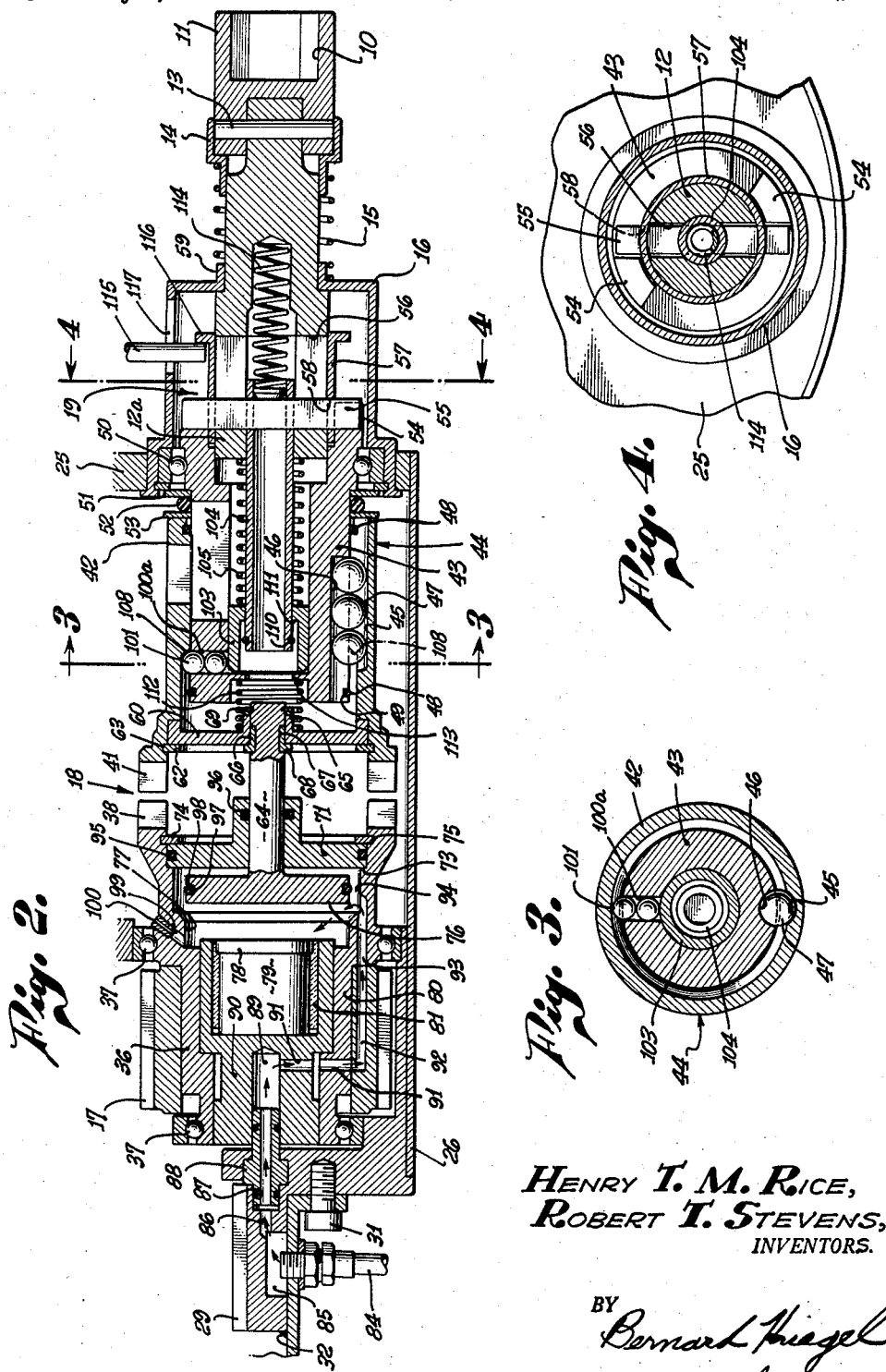

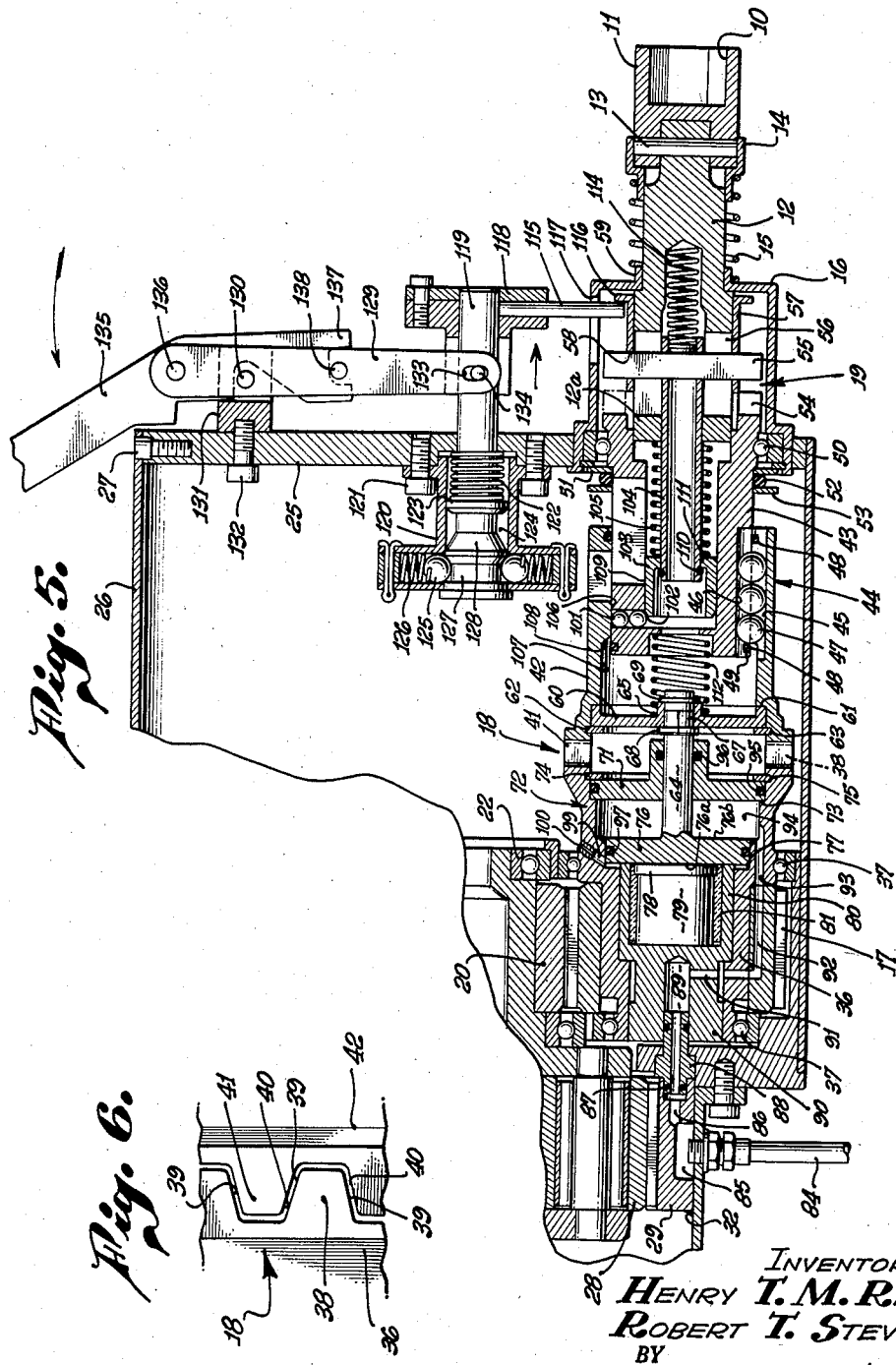

2,842,240

AIR AND MAGNETIC RELEASABLE TORQUE TRANSMITTING APPARATUS

Henry T. M. Rice, San Gabriel, and Robert T. Stevens, Altadena, Calif., assignors, by decree of distribution, to Adele M. Stevens, executrix of the estate of Dillon Stevens, deceased Application May 6, 1952, Serial No. 286,252

21 Claims. (Cl. 192—56)

The present invention relates to torque transmitting apparatus, and more particularly to devices which automatically disconnect the drive when the torque transmitted exceeds a predetermined value.

In the application of Dillon Stevens, Henry T. M. Rice and Robert T. Stevens, Serial No. 190,344 filed October 16, 1950, for "Releasable Torque Transmitting Apparatus," now Patent No. 2,741,352 the driving and driven elements of a torque releasable clutch are maintained in engagement, until a predetermined torque is transmitted, by either a magnet or by air under a pressure differential. When air under the pressure differential supplies the force for holding the clutch elements engaged, release of this pressure differential is effected by the torque being transmitted, disengaging a valve member from its companion seat, which thereby releases the holding force and enables the clutch elements to disengage under substantially no-load conditions. Reengagement of the valve member with its seat and of the clutch elements can be obtained through use of a suitable spring member.

It is desirable to use as light a spring as possible, so that it exerts a comparatively minor force holding the clutch elements engaged, and also provides a small force to be overcome upon clutch release and locking of the clutch in released position. Accordingly, the torque at which clutch release occurs is almost entirely dependent upon the air pressure tending to hold the valve member engaged with its seat. However, with the use of a light spring, assurance is not had that the valve member will be fully engaged with its seat, particularly since the spring expands in shifting the valve member into engagement with its seat, the force exerted by it decreasing correspondingly.

Accordingly, an object of the present invention is to provide releasable torque transmitting apparatus of the air or gas operated type, in which proper closing of the valve member holding the clutch elements engaged with its companion seat is assured, despite the use of a relatively light spring, or equivalent part, for shifting the valve member toward its seat.

Another object of the invention is to provide releasable torque transmitting apparatus of the air or gas operated type, in which a supplemental force is provided to shift the clutch engaging valve member toward its seat, to offset the declining force exerted by a spring as the latter moves the clutch and valve member to engaged and operating positions.

A further object of the invention is to provide releasable torque transmitting apparatus embodying a clutch, in which the clutch elements are held engaged, both magnetically and by air, or an equivalent fluid medium, the magnetic device serving not only to hold the clutch engaged, but to insure the proper operation of the air portion of the apparatus.

Yet another object of the invention is to provide releasable torque transmitting apparatus embodying a clutch, which is held engaged by both magnetic force and air pressure, in which the magnetic holding force drops off very rapidly as the torque transmitted commences release of the clutch, to enable full and rapid release of the air pressure tending to hold the valve engaged.

Yet a further object of the invention is to provide an improved apparatus for automatically effecting release of a clutch when a predetermined torque is transmitted therethrough, in which the torque at which release of the clutch occurs can be readily varied.

Another object of the invention is to provide multiple stage releasable torque transmitting apparatus, in which the lower limit at which torque release will occur is dependent upon the force exerted by a magnet, and in which the higher torque at which release can occur is dependent upon the force exerted by air under pressure differential. This latter force may actually supplement the magnetic force.

Yet another object of the invention is to provide releasable torque transmitting apparatus embodying a clutch held in engagement by air under pressure, and which necessitates the use of a comparatively small quantity of air in its operation.

Still another object of the invention is to provide an improved multiple or gang releasable torque transmitting apparatus.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through a gang or multiple releasable torque transmitting apparatus, with only one of the torque releasing devices specifically disclosed, for purposes of clarity;

Fig. 2 is an enlarged longitudinal section through the torque release apparatus, with the primary clutch in disengaged position;

Fig. 3 is a cross-section taken along the line 3—3 on Fig. 2;

Fig. 4 is a cross-section taken along the line 4—4 on Fig. 2;

Fig. 5 is a longitudinal section, similar to Fig. 1, with the primary clutch reengaged and the secondary clutch in disengaged position;

Fig. 6 is an enlarged side elevation disclosing several of the coengaging primary clutch teeth.

The apparatus illustrated in the drawings has been designed primarily for simultaneously rotating and tightening a plurality of threaded fastening elements (not shown) to a predetermined torque value. If nuts are to be tightened, they are each receivable within a socket portion 10 of a head 11 mounted upon the ultimate driven spindle 12 of each device, and secured for rotation therewith by a transversely extending pin 13, which is prevented from shifting from its assembled position by a suitable retaining sleeve 14 slidable on the spindle 12 and the socket head 11. This retaining sleeve 14 is held in position adjacent the transverse pin by a suitable helical compression spring 15 bearing against the sleeve and against the forward housing extension 16 of the releasable torque transmitting transmitting device.

The spindle 12 is rotated by imparting suitable rotation to a drive gear 17, this rotation being transmitted to the spindle through a primary clutch 18 and a secondary clutch 19. The drive gear 17 meshes with a sun gear 20 suitably attached to a carrier 21 rotatably mounted in bearings 22 in the rearward end member 23 of the supporting frame or housing 24. The frame also includes a forward end plate or wall 25 which is connected to the rear member 23 by an encompassing sleeve or side wall 26, attached to both the forward and rear end supports through the use of cap screws 27.

Supported upon the planet carrier 21 in a suitable manner are planet pinions 28 engaging a stationary orbit gear 29 attached to a rearward housing extension 30, which is secured to the rearward end wall or support 23 by cap screws 31. The attachment can occur in any suitable manner, as through the use of solder 32. The pinions 28 also engage a driving sun gear 33 suitably attached to a drive shaft 34, whose forward end is piloted within a roller bearing 35 disposed within the planet carrier 21. The drive shaft 34 is attached, directly or indirectly, to a suitable prime mover (not shown), such as an electric or air motor, which will rotate the shaft at the desired speed.

Actually, there are a plurality of drive gears 17 and associated primary and secondary clutches 18, 19 disposed around the main or central axis of the apparatus disclosed, the sun gear 20 meshing with all of the drive gears. For example, there may be five drive gears 17 and associated torque transmitting apparatus disposed around the sun gear 20. Each drive gear 17 encompasses and is secured to the driving member 36 of the primary clutch 18, this latter part being suitably supported in the rearward end support 23 through the axially spaced ball bearings 37. The forward portion of the driving member is provided with axially extending clutch teeth 38 having inclined or cam type of driving faces 39 (Fig. 6) engaging companion inclined faces 40 on driven clutch teeth 41 provided on the driven member 42 of the primary clutch 18. The rotation of the driven member 42 is imparted to the driving member 43 of the secondary clutch 19 through a slidable spline connection 44. As illustrated, this spline connection includes opposed longitudinal grooves 45, 46 provided within the driven member 42 and the driving member 43 of the secondary clutch, which receives one or a plurality of ball elements 47 therewith, which, in effect, function as rollable keys, serving to transmit the rotation of the driven member to the secondary driving member, while allowing the driven member 42 to shift axially along the driving member 43. The balls 47 are prevented from dropping out of the longitudinal grooves 45, 46 by providing split snap rings 48 within grooves 49 at the rear end portion of the secondary driving member 43 and also in the forward end portion of the primary clutch driven member 42.

The secondary clutch driving member 43 is rotatably mounted within the rear portion of the forward housing extension 16, which is carried in the forward end wall 25 of the main housing of the apparatus, through the agency of a ball bearing 50, which serves to transmit radial loads between the secondary driving member 43 and housing extension 16, as well as to resist axial displacement of the secondary driving member. Disposed just rearwardly of the bearing 50 is an elastic bumper that can be engaged by the forward end of the primary clutch driven member 42. This elastic bumper includes an annular member 51 adapted to engage the ball bearing assembly 50, the member 51, in turn, being engaged by a rubber, or rubber-like, ring 52, which has another annular member 53 engaging it. When the driven member 42 of the primary clutch 18 is shifted in a forward direction, to disengage it from the driving member 36 of the primary clutch, its forward motion is limited by engagement with the cushioning device 51—53, which also absorbs any shock incident to the bringing of the driven member 42 to rest, insofar as its longitudinal movement is concerned.

The driving member 43 of the secondary clutch 19 is provided with a plurality, such as a pair, of diametrically opposed clutch teeth or lugs 54 (Fig. 4) engageable with a transverse pin 55 extending through a transverse and elongate slot 56 formed through the rearward portion of the spindle or driven member 12 of the secondary clutch. This pin may be of square or rectangular cross-section, and will transmit the rotation of the driving member 43 of the secondary clutch to the spindle 12. The pin 55 may be shifted axially away from the driving clutch teeth 54, to disengage the secondary clutch, by axially shifting a sleeve 57 encompassing the spindle 12 and through which the pin 55 extends. The pin 55 extends through holes 58, which are diametrically opposed square holes, in the sleeve 57 in a relatively snug fashion; so that the sleeve tends to prevent tilting or cocking of the transverse pin in the slot 56. The rear portion 12a of the spindle 12 is piloted within the forward portion of the driving member 43 of the secondary clutch, the spindle projecting outwardly through a boss or bearing support 59 provided on the housing extension 16, which functions as a rotatable bearing for the spindle.

The rotation of the driving member 36 of the primary clutch 18 is transmitted to the driven member 42 through the coengaging cam type of clutch teeth 38, 41. The torque being transmitted between these teeth tends to shift the driven member 42 axially out of engagement from the driving member 36, because of the slope of the teeth faces 39, 40. The driven clutch teeth 41 are held in engagement with the driving teeth 38 against the disengaging force associated with the transmitted torque by both an air, or similar gas, pressure differential device, and by a magnetic device. Thus, a plate 60 is secured against axial movement with respect to the driven member 42 of the primary clutch by bearing against a shoulder 61 on the driven member, being retained in this position by a suitable split snap ring 62 disposed in a groove 63 in the driven member.

A valve and armature stem 64 is attached to this plate, the stem extending through the hub 65 of the latter. Movement of the stem with respect to the plate in one direction is prevented by a pair of split sleeve elements 66 disposed in a circumferential groove 67 in the valve stem and encompassed by the hub portion 65 of the plate. A flange 68 on the split or segmental sleeve 66 engages the rearward face of the plate 60, the forward portion of the plate hub 65 engaging a retaining split snap ring 69 disposed within a groove 70 in the stem 64. By virtue of the parts just referred to, the plate 60 is attached to the valve stem 64.

The valve stem 64 extends through a forward end closure member 71, which forms part of the valve body portion 72 of the driving member 36. The end closure portion 71 is secured to the driving member 36 by engaging a shoulder 73 on the driving member, being retained thereagainst by a split snap retaining ring 74 disposed in a groove 75 in the driving member 36. The rearward end of the stem 64 is secured to, or is integral with, an armature and valve head 76 which is adapted to fit within a cylindrical seat 77 formed in the driving member valve body 72. When disposed fully within this seat 77, the rearward face 76a of the head 76 is adapted to engage a pole piece 78 contacting a permanent magnet 79 disposed within a cup-shaped holder 80 that is secured within the driving member 36 of the primary clutch 18. A suitable non-magnetic shield or sleeve 81 is disposed between the permanent magnet 79 and the cup-shaped holder 80.

It is apparent that the holding force of the magnet 79 against the armature and valve head 76 will act through the valve stem 64 and driven plate 60 to tend to hold the clutch teeth 41 of the driven member 42 fully engaged or meshed with the clutch teeth 38 of the driving member 36. Another holding force is also provided by causing air under pressure to act on the forward face 76b of the valve head 76 and urge it against the magnet 78, 79 and retain it within its cylindrical seat 77. Air from a suitable source (not shown) and under pressure flows through a line 82 and through a regulator valve 83, which can adjust the air pressure delivered to the valve body 72, this air then flowing through an inlet line 84 and into a peripheral groove 85 formed in the orbit gear 29. From the peripheral groove 85, the air is distributed to each of the torque transmitting devices disposed around the main axis of the apparatus.

From the groove 85, the air flows through an orbit gear passage 86 and through the passage 87 of a swivel tube 88 that is carried in the rearward end support 23. The forward portion of this tube is piloted in the passage 89 of a member 90 secured within the rearward portion of the driving member 36 of the primary clutch. This latter passage 89 communicates with a radial port 91 which has a continuation extending through the driving member 36 of the primary clutch and into a longitudinally extending passage 92 through the drive gear 17. This passage 92 communicates with a longitudinal passage 93 extending in a forward direction through the driving clutch member 36 and on into the chamber 94 of the valve body portion 72 of the driving clutch member disposed rearwardly of the valve body closure member 71.

Thus, air under pressure is delivered into the chamber 94, which has a relatively small volume. The forward end of the chamber 94 is defined by the valve body closure plate 71, leakage in a forward direction from the chamber being precluded by a peripheral seal 95 on the closure member engaging the inner wall of the valve body 72, and also by a rod packing 96 disposed on the closure member 71 and slidably and sealingly engaging the valve stem 64. Leakage of air from the chamber 94 in a rearward direction is prevented whenever the armature and valve head 76 is disposed within the cylindrical seat 77. The head carries a peripheral sealing member 97 in a groove 98, which is adapted to engage the cylindrical seat 77.

The extent of insertion of the seal ring 97 within the cylindrical seat 77 is preferably of comparatively little extent, for example, of about a sixteenth of an inch, in order that only a slight forward movement of the valve head 76 will disengage the seal ring 97 from the seat 77, and thereby allow the air in the chamber 94 and acting on the forward face 76b of the head to pass to its rearward face 76a, thus equalizing the pressure on both sides of the head 76. Such equalizing effectively nullifies the force of the air pressure tending to hold the valve head 76 within its cylindrical seat 77 and in contact with the permanent magnet 78, 79, this force also being exerted on the driven member 42 and tending to hold its teeth 41 engaged with the driving member clutch teeth 38.

When the valve head 76 is shifted forwardly from its seat 77 by the driven member 42, the air pressure not only equalizes both sides of the head, but it can also exhaust from the valve body chamber 94 through an outlet or exhaust passage 99, which preferably has an orifice 100 threaded, or otherwise suitably secured, therein with a comparatively small passage area; to decrease the rate at which the air under pressure can exit from the valve chamber 94. Accordingly, when the valve head 76 has been shifted forwardly out of engagement from the cylindrical seat 77, very little air is lost from the chamber 94, despite the fact that it is still being supplied with air under pressure from the inlet line 84, in view of the restriction to flow offered by the orifice 100.

As was stated above, the air under pressure acting upon the forward face 76b of the valve head 76 tends to hold it engaged within its seat 77, and thereby tends to hold the driven clutch teeth 41 in full meshing engagement with the driving clutch teeth 38. This force is supplemented by the magnetic force exerted by the permanent magnet 79. However, when the torque being transmitted is sufficient to overcome the holding forces of the air under pressure within the valve body 72 and of the permanent magnet 79, the cam teeth 38, 41 shift the driven member 42 in a forward direction, to break the contact of the armature and valve head 76 with the magnet, and also to disengage it from the seat 77. Since it takes only a slight movement of the valve head 76 to effectively remove substantially all of the holding force of the magnet and the air pressure upon it, full disengagement between the teeth 38, 41 occurs under comparatively no-load conditions, the driven member 42 being shifted longitudinally along the driving member 43 of the secondary clutch with very little load being imposed upon the clutch teeth as they disengage. The driven member 42 is moved forwardly, its forward motion being resisted and arrested by the bumper device 51—53.

The driven member is retained in the above disengaged position by a latch arrangement. The driving member 43 of the secondary clutch 19 has a plurality of radial holes 100a therein containing ball detent members 101. The inner portions of these ball detent members are engaged by a tapered rearward cam face 102 on a latch sleeve 103, which is slidable within the driving member 43 of the secondary clutch, and also along a tubular member 104 piloted within the spindle 12 and secured to the secondary clutch transversely extending pin 55 that passes therethrough. A spring 105 constantly urges the latch sleeve 103 in a rearward direction, causing its cam face 102 to tend to shift the latch balls 101 in a radial outward direction. However, such shifting cannot occur when the driven clutch member 42 is fully engaged with the driving clutch member 36, since the balls then engage the inner cylindrical surface 106 of the driven member. When the driven member is shifted in a forward direction to clutch disengaged position, an enlarged bore 107 of the driven member 42 is then placed opposite the balls 101, allowing the latter to be shifted radially outward by the tapered face 102 of the latch sleeve, coming to rest upon an internal inclined tapered shoulder 108 formed within the driven member. When the balls 101 are shifted radially outward, the latch sleeve 103 slides therealong, to place the cylindrical periphery 109 of the sleeve opposite the balls. Accordingly, the driven member 42, if shifted in a rearward direction, cannot shift the balls 101 radially inward, in view of their engagement with the cylindrical periphery 109 of the latch sleeve. The driven member cannot be reengaged with the driving member 36 until permitted to do so by the removal of the latch balls 101 from their holding position.

In order to release the latch balls, it is necessary to shift the secondary clutch pin 55 out of engagement with the driving lugs or teeth 54 of the secondary clutch. This action occurs as a result of shifting the sleeve 57 on the spindle 12, and through which the pin 55 extends, in a forward direction along the spindle. When moved in the forward direction, not only is the clutch pin 55 disengaged from the lugs 54, but the sleeve or tube 104 piloted within the forward portion of the spindle is also moved in a forward direction, engaging a snap ring 110 at the rearward portions of the sleeve with an internal flange 111 on the latch sleeve 103, and shifting the latter in a forward direction against the force of the latch spring 105; so that the cylindrical periphery 109 of the latch sleeve is removed from behind the latch balls 101. When such removal occurs, the tapered shoulder 108 on the driven member 42 is then effective to shift the latch balls 101 radially inward out of engagement with the shoulder, allowing the driven member clutch teeth 41 to move back into full meshing engagement with the driving clutch teeth 38, and to dispose the inner cylindrical surface 106 of the driven member again alongside the latch balls.

The return or resetting engagement of the driven member 42 with the driving member 36 occurs under the influence of a spring 112, which engages a suitable seat 113 at the rearward portion of the driving member 43 of the secondary clutch, and which also bears against the driven plate 60 secured to the driven member. This spring not only reengages the driving and driven clutch teeth 38, 41 with one another, but it also reshifts the armature and valve head 76 back into engagement with the permanent magnet 78, 79 and the cylindrical seat 77.

The shifting sleeve 57 is moved to secondary clutch disengaging position against the force exerted by a reengaging spring 114, which has one end bearing against the spindle 12 and the other end bearing against the pin 55. This spring constantly urges the secondary clutch pin 55 into engagement with the driving lugs 54. However, the secondary clutch 19 can be shifted to a disengaged position and maintained in this position by a pin 115 engaging a forward flange 116 on the shift sleeve 57 and extending through a slot 117 in the housing extension 16. The radial pin 115 projects from a head 118 which is suitably secured on a shift rod 119 slidable through the forward end wall 25 of the housing. Of course, there is one pin 115 for each of the secondary clutch members 19 in the multiple or gang apparatus, these pins being held in the head by a suitable plate 120 fastened to the latter by cap screws 121.

The rod 119 extends to the interior of the housing 24 and projects through a spring and detent housing 120 attached to the forward end wall 25 by cap screws 121. A spring 122 is disposed within this housing 120, one end bearing against the forward end wall 25 and the other end bearing upon a flange 123 formed on the shift rod 119, which defines one side of a groove 124 on the rod into which ball detent elements 125 are urged by springs 126 that bear against the outer peripheral portion of the housing 120. Another peripheral groove 127 is formed on the shift rod 119 rearwardly of the groove 124 just referred to, for the reception of the ball detents 125 and to hold the shift rod 119 and the secondary clutches 19 in disengaged position.

It is evident that when the shift rod 119 occupies the position disclosed in Fig. 1, the ball detents 125 maintain it in such position by engaging the side walls 123, 128 of the forward shift rod groove 124, the reengaging springs 114 then being allowed to engage each transverse pin 55 with the driving lugs 54 of the secondary clutches 19, and to maintain such engagement. When the shift rod 119 is moved in a forward direction, the ball detents 125 are urged out of the groove 124 by the rearward tapered wall 128 of the groove, and will snap into the rearward groove 127. Such forward motion of the shift rod 119 acts through the pins 115 to shift the sleeves 57 and the transverse clutch pins 55 out of engagement with the driving lugs 54, the detents 125 then holding the shift rod 119 and the secondary clutches 19 out of engagement against the force exerted by the reengaging springs 114.

The shift rod 119 is moved by actuating a shift lever 129. This lever is mounted on a fulcrum pin 130 carried by a suitable bracket 131 attached to the forward wall 25 of the apparatus by a cap screw 132. The lower end of the lever 129 is formed with a slot 133 in which a pin 134 is received that projects from the shift rod 119. The shift lever 129 carries a secondary clutch control lever 135 pivoted on a pin 136 on its upper end, and this secondary lever has spaced actuating fingers 137 engageable with a pin 138 projecting from the shift lever 129. When the secondary lever 135 is moved in one direction, as to the left (as seen in Fig. 1), the rearward actuating finger 137 engages the pin 138 to move the shift lever 129 in a forward direction, which then moves the shift rod 119 in this same direction to disengage all the secondary clutches 19.

The ball detents 125 are forced out of the forward groove 124, but will then snap into the rearward groove 127, acting on the forward face 139 of the latter to move the shift rod 119 rather rapidly in a forward direction under the impetus of the springs 126. This rapid motion is allowed, in view of the lost motion or clearance existing between the pin 138 on the shift lever 129 and the forward actuating finger 137. The diameter of the pin 138 is much less than the distance between the fingers 137, allowing the shift rod 119 to snap to its disengaged position. Similarly, when the secondary control lever 135 is moved in the opposite direction, the forward finger 137 engages the pin 138, to shift the rod 119 rearwardly. When the balls 125 are forced out of the rearward groove 127, the spring 122 accelerates the movement of the shift rod 119, and moves the pins 115 out of the way of the flanges 116 on the shift sleeves 57 in a rapid manner, allowing the reengaging springs 114 to reengage all of the secondary clutches 19. During this rapid action of the shift rod 119, the shift lever 129 can move without interference from the actuating fingers 137 of the secondary control lever 135, since the rearward actuating finger 137 is disposed a substanial distance to the rear of the pin 138 when the latter is engaged by the forward actuating finger 137.

In the operation of the apparatus, the parts of each device may be assumed initially to occupy the position illustrated in Fig. 1, in which the primary and secondary clutches 18, 19 are both engaged, the valve head 76 engaging the permanent magnet 78, 79 and also having its seal ring 97 disposed within the cylindrical seat 77. Air under the desired pressure is allowed to flow through the passages 87, 89, 91, 92, 93 and into the valve chamber 94, this air acting upon the forward face 76b of the valve head and tending to hold the latter and the driven member 42 in the rearward direction, to secure the primary clutch 18 in driving position. The socket head 11 may then be applied to a nut (not shown) and the drive shaft 34 rotated, the rotation being transmitted through the gearing 33, 28, 21, 20 to the drive gear 17 and driving member 36, passing through the clutch teeth 38, 41 to the driven member 42, and from the driven member through the splines 45—47 to the driving member 43 of the secondary clutch 19, from where it passes through the transverse pin 55 to the spindle 12 and the socket head 11. As the threaded fastening element, such as the nut (not shown), is tightened, the torque transmitted increases, this torque acting through the inclined coengaging clutch teeth 38, 41 and tending to shift the driven clutch member 42 in a forward direction out of engagement from the driving clutch member 36. This action is resisted by the holding force of the permanent magnet 79 and the air pressure acting upon the valve head 76. To some extent, the holding force is also being provided by the clutch reengaging spring 112, which, as described below, is preferably made comparatively light so that its force is of minor significance.

When the predetermined force or torque is transmitted, corresponding to the holding force of the magnet and of the air under pressure, the driven member 42 is shifted in a forward direction. The initial shifting motion moves the valve head 76 away from the permanent magnet 78, 79, which then exerts a considerably decreased holding force on the armature 76, and this decrease of holding force then enables the torque being transmitted to rapidly shift the head 76 out of the cylindrical seat 77. As soon as disengagement from the cylindrical seat occurs, the air on the forward side 76b of the head 76 can pass to the rearward side 76a, equalizing the pressure on the head and reducing the holding force due to the air pressure to substantially zero. Accordingly, the torque transmitted can fully shift the driven member 42 in a forward direction to fully disengaged position under substantially no-load conditions.

As soon as the shoulder 108 of the driven member 42 comes opposite the latch balls 101, the spring 105 urges the latch sleeve 103 in a rearward direction to force the balls 101 outwardly upon the shoulder 108 and thereby hold the driven member 42 in disengaged position with respect to the driving member 36 (Fig. 2). The drive to the spindle 12 and socket head 11 is thereby disrupted. The secondary clutch 19, however, remains in engagement.

When all of the threaded fastening elements have been tightened to the predetermined torque, and all of the primary clutches 18 have been released, the latter may be reset as a result of disengaging the secondary clutches 19. Such disengagement occurs by shifting the secondary clutch control lever 135 to the left, in order to shift the shift rod 119 to the right, or in the forward direction, causing the pins 115 to engage the sleeve flanges 116 and move the transverse secondary clutch pins 55 out of engagement with the driving lugs 54. The ball detents 125 will retain the shift rod and all of the secondary clutch pins in the disengaged position, in the manner illustrated in Fig. 5. As described above, such forward shifting of the sleeves 57 and the pins 55 carries the tubular elements 104 in the forward direction; so that each snap ring 110 engages the latch sleeve 103 and shifts it forwardly out of retaining position behind the balls 101, whereupon the primary clutch reengaging spring 112 for each unit becomes effective to shift each driven member 42 back into full engagement with the driving member 36, the inclined shoulder 108 on the driven member retracting the latch balls 101 to their initial positions. The spring 112, of course, will also reshift the valve head 76 into engagement with its seat 77 and the permanent magnet 78, 79, the air trapped behind the valve head escaping through the orifice 100.

The secondary clutches 19 remain disengaged. Accordingly, despite any rotation that might be imparted to the driving clutch members 36, such rotation is not supplied to the spindles 12 and socket heads 11. The motion will only be transmitted to these parts upon shifting of the clutch control lever 135 in the opposite direction or to the right. When this is done, the pins 115 are shifted rearwardly out of bearing engagement against the sleeve flanges 116, allowing the springs 114 to shift the transverse clutch pins 55 rearwardly until they are engaged with the lugs or teeth 54 of the secondary clutch driving members 19. The parts are then operable to rotate the socket heads 11 and tighten other threaded fastening elements to the predetermined torques for which the device may be set (Fig. 1).

The air and magnetic holding device that maintains the primary clutch elements in engagement with one another have the characteristic that only a slight forward movement of the driven clutch member 42 is necessary to reduce the holding force considerably, and thereby enable complete disengagement between the clutch members to occur under substantially no-load conditions. However, some force is being exerted by the reengaging spring 112. It is desired that this spring be made as light as possible, inasmuch as it compresses as the driven member shifts to clutch disengaging position, the force exerted by the spring actually increasing. With the spring 112 designed to exert a relatively low force, one which is just sufficient to shift the driven member 42 to reengaged position with the driving member 36, and to move the valve head 76 toward its position of engagement with the permanent magnet 78, 79 and within its cylindrical seat 77, the force exerted by the spring may be disregarded. However, even this small force decreases as the parts are shifted toward their reengaged position because of the expansion of the spring 112. Despite this fact, assurance is had that the armature and valve member 76 will be shifted completely within the cylindrical seat 77 and into engagement with the permanent magnet 78, 79, and also that the clutch teeth 38, 41 are engaged to the full extent desired, since the declining force of the spring 112 is offset by the attraction of the magnet 78, 79 upon the armature 76, as the latter approaches the magnet. As approach occurs, the force or pull of the magnet increases, thereby offsetting the lessened force provided by the spring 112, and allowing the latter to be made lighter than would have otherwise been necessary, in the absence of the permanent magnet. Thus, the permanent magnet 78, 79 not only adds its holding force to maintain the primary clutch members 38, 41 in engagement, but it also insures the repositioning of the driven member 42 and of the armature and valve head 76 to their desired initial locations.

The combination of the magnet and the air pressure to hold the primary clutch 18 engaged offers still a further advantage. The minimum torque at which the apparatus will release is governed by the holding force of the permanent magnet 79, since the regulator valve 83 can be closed completely, no air under pressure being supplied to the valve body chamber 94. Accordingly, the primary clutch will release at a predetermined torque, determined by the holding force of the magnet. The torque at which the clutch will release can be increased by allowing air to flow into the driving member air chamber 94, for action upon the valve head 76, urging and holding it in an engaged position with its companion cylindrical seat 77. Thus, the device lends itself to multiple stage operations. An initial tightening of the threaded fastening element can occur by cutting off the air supply to the chamber 94 completely. The primary clutch 18 will then release when the threaded fastening element has been tightened to the predetermined lower torque, dependent upon the holding force of the permanent magnet 79. The mechanism can then be reset to reengage the primary clutch 18 and air under a predetermined pressure allowed to flow into the chamber 94, the force of this air adding to the holding force of the magnet. As a result, the primary clutch 18 can then only become automatically disengaged when a higher torque is being transmitted to the spindle 12, socket head 11 and threaded fastening element.

Thus, the mechanism can be used to obtain an initial preliminary tightening of the threaded fastening element, and then a final tightening of the threaded fastening element. The final torque will depend upon the pressure of the air supplied to the chamber 94, and this pressure can be varied by means of the regulator valve 83. Accordingly, it is possible to tighten the threaded fastening element in stages, and to any selected final degree, depending upon the air pressure supplied.

It is to be noted that the volume of the air chamber 94 is comparatively small. Accordingly, only a small quantity of air need be supplied at the desired pressure to hold the valve head 76 in full engagement with its seat 77. Also, upon release of the valve head 76, the air becomes equalized on both of its sides; so as to nullify the holding force of pressure tending to maintain the primary clutch teeth 38, 41 in engagement. Despite the fact that the valve head 76 is removed from its companion seat 77, air is still incapable of escaping at any rapid rate from the chamber, in view of the presence of the comparatively small orifice 100. Accordingly, a very small quantity of air under pressure is consumed in operating the device. As a matter of fact, it is unnecessary, in using the apparatus on repetitive work, to shut off the flow of air to the apparatus between operations.

The air under pressure becomes effective in assisting the complete shifting of the driven member 42 out of engagement from the driving member. It is to be noted that the area of the rear face 76a of the valve head 76 is greater than the area 76b of the forward face, upon which the air under pressure can act. This is due to the presence of the valve rod stem 64 extending through the end closure 71 of the chamber 94. Accordingly, once the valve head seal 97 has been even slightly disengaged from the cylindrical seat 77, the air under pressure not only can pass to the rearward face 76a of the valve head, so as to neutralize the action of the air under pressure tending to hold the primary clutch 18 in engagement, but this air is actually effective over the area of the rod or stem 64 to shift the head 76, stem 64, plate 60 and the driven member 42 in a forward direction, to completely disengage the driven member 42 from the driving member 36.

The inventors claim:

1. In torque transmitting apparatus: driving and driven members; coengaging elements on said members effecting a rotatable driving connection between said members, said elements being responsive to the torque transmitted to said members and tending to be disengaged by said torque; fluid operated means exerting a holding force on said elements tending to maintain them in engagement with each other; and magnetic means acting upon said fluid operated means to exert a holding force on said elements tending to maintain them in engagement with each other while said elements are tending to be disengaged by said torque.

2. In torque transmitting apparatus: driving and driven members; coengaging elements on said members effecting a rotatable driving connection between said members, said elements being responsive to the torque transmitted to said members and tending to be disengaged by said torque; fluid operated means exerting a holding force on said elements tending to maintain them in engagement with each other; and magnetic means exerting a holding force on said elements tending to maintain them in engagement with each other while said elements are tending to be disengaged by said torque.

3. In torque transmitting apparatus: driving and driven members; coengaging clutch elements on said members effecting a rotatable driving connection between said members, said elements comprising cam means responsive to the torque transmitted through said members to disengage said elements from each other; fluid operated means exerting a holding force on said clutch elements tending to maintain them in engagement with each other; and magnetic means acting on said fluid operated means to exert a holding force on said clutch elements tending to maintain them in engagement with each other while said elements are tending to be disengaged by said torque.

4. In torque transmitting apparatus: driving and driven members; coengaging clutch elements on said members effecting a rotatable driving connection between said members, said elements comprising cam means responsive to the torque transmitted through said members to disengage said elements from each other; a first valve member rotatable with one of said members; a second valve member subject to fluid under pressure differential on one side thereof when engaged with said first valve member to hold said clutch elements in driving relation with respect to each other, said first and second valve members being disengaged from each other upon relative movement between said clutch elements toward disengaged position; and magnetic means acting on one of said valve members to urge it into engagement with the other of said valve members.

5. In torque transmitting apparatus: driving and driven members; coengaging clutch elements on said members effecting a rotatable driving connection between said members, said elements comprising cam means responsive to the torque transmitted through said members to disengage said elements from each other; one of said members having a valve seat member; a valve head member subject to fluid under pressure differential on one side thereof to be urged by such fluid into engagement with said seat to hold said clutch elements in driving relation with respect to each other, said valve head member and valve seat member being disengaged from each other upon relative movement between said clutch elements toward disengaged position; and magnetic means acting on one of said valve members to urge it into engagement with the other of said valve members.

6. In torque transmitting apparatus: driving and driven members; coengaging clutch elements on said members effecting a rotatable driving connection between said members, said elements comprising cam means responsive to the torque transmitted through said members to disengage said elements from each other; one of said members having a valve seat; a valve head rotatable with the other of said members and subject to fluid under pressure differential on one side thereof to be urged by such fluid into engagement with said seat to hold said clutch elements in driving relation with respect to each other; and magnetic means carried by said one of said members and acting on said head to urge it into engagement with said seat and to hold said clutch elements in driving relation with respect to each other.

7. In torque transmitting apparatus: driving and driven members; coengaging clutch elements on said members effecting a rotatable driving connection between said members, said elements comprising cam means responsive to the torque transmitted through said members to disengage said elements from each other; said driving member having a valve seat; a valve head rotatable and movable axially with said driven member and subject to fluid under pressure differential on one side thereof to be urged axially into engagement with said seat to hold said clutch elements in driving relation with respect to each other; and magnetic means carried by said driving member and acting on said head to urge it axially into engagement with said seat and to urge said clutch elements into driving relation with respect to each other.

8. In torque transmitting apparatus: driving and driven members; coengaging clutch elements on said members effecting a rotatable driving connection between said members, said elements comprising cam means responsive to the torque transmitted through said members to disengage said elements from each other; said driving member having a valve seat; a valve head rotatable and movable axially with said driven member and subject to fluid under pressure differential on one side thereof to be urged axially into engagement with said seat to hold said clutch elements in driving relation with respect to each other; magnetic means carried by said driving member and acting on said head to urge it axially into engagement with said seat and to urge said clutch elements into driving relation with respect to each other; and spring means for axially shifting said driven member toward said driving member to coengage said clutch members on said elements and to urge said head toward said valve seat and magnetic means.

9. In torque transmitting apparatus: driving and driven members; coengaging clutch elements on said members effecting a rotatable driving connection between said members, said elements comprising cam means responsive to the torque transmitted through said members to disengage said elements from each other; means providing a closed chamber rotatable with one of said members, said chamber having a fluid inlet and a fluid outlet; a valve member connected to the other of said members to prevent substantial relative axial movement therebetween, said valve member being disposed in said chamber to be acted on by fluid under pressure therewithin to close said outlet and to maintain said clutch elements in driving relation with respect to each other; said valve member being shifted by said other of said members to a position opening said outlet upon a predetermined torque being transmitted through said clutch elements to enable said elements to be disengaged from each other.

10. In torque transmitting apparatus: driving and driven members; coengaging clutch elements on said members effecting a rotatable driving connection between said members, said elements comprising cam means responsive to the torque transmitted through said members to disengage said elements from each other; means providing a closed chamber on one of said members, said chamber having a fluid inlet and a fluid outlet; a valve member connected to the other of said members and disposed in said chamber to be acted on by fluid under pressure therewithin to close said outlet and to maintain said clutch elements in driving relation with respect to each other; said valve member being shifted by said other of said members to a position opening said outlet upon a predetermined torque being transmitted through said clutch elements to enable said elements to be disengaged from each other; and magnetic means acting on said valve member to urge it toward outlet closing position and to urge said clutch elements in driving relation with respect to each other.

11. In torque transmitting apparatus: a driving member; a driven member movable axially with respect to said driving member; coengaging clutch elements on said members effecting a rotatable driving connection between said members, said elements comprising cam means responsive to the torque transmitted through said members to shift said driven member axially with respect to said driving member to disengage said elements from each other; said driving member having a closed chamber provided with a fluid inlet and a fluid outlet; a valve member connected to said driven member and disposed in said chamber to be acted on by fluid under pressure therewithin to close said outlet and to maintain said clutch elements in driving relation with respect to each other; said valve member being shifted by said driven member to a position opening said outlet upon a predetermined torque being transmitted through said clutch elements to enable said driven member to be shifted axially with respect to said driving member and to disengage said elements from each other.

12. In torque transmitting apparatus: a driving member; a driven member movable axially with respect to said driving member; coengaging clutch elements on said members effecting a rotatable driving connection between said members, said elements comprising cam means responsive to the torque transmitted through said members to axially shift said driven member relative to said driving member to disengage said elements from each other; said driving member having a closed chamber provided with a fluid inlet and a fluid outlet; a magnet on said driving member; a valve and armature member connected to said driven member and disposed in said chamber to be acted on by said magnet and by fluid under pressure therewithin to close said outlet and to maintain said clutch elements in driving relation with respect to each other; said valve and armature member being shifted by said driven member to a position disengaged from said magnet and opening said outlet upon a predetermined torque being transmitted through said clutch elements to shift said driven member axially of said driving member and to disengage said elements from each other.

13. In torque transmitting apparatus: driving and driven members; coengaging clutch elements on said members effecting a rotatable driving connection between said members, said elements comprising cam means responsive to the torque transmitted through said members to disengage said elements from each other; means providing a closed chamber rotatable with one of said members, said chamber having a fluid inlet and a fluid outlet; a valve member disposed in said chamber and having a stem extending from said chamber and operatively connected to the other of said members to prevent substantial relative axial movement between said valve member and said other of said members, said valve member being acted on by fluid under pressure in said chamber to be urged toward a position closing said outlet and maintaining said clutch elements in driving relation with respect to each other; said valve member being shifted by said other of said members to a position opening said outlet upon a predetermined torque being transmitted through said clutch elements to enable said elements to be disengaged from each other.

14. In torque transmitting apparatus: driving and driven members; coengaging clutch elements on said members effecting a rotatable driving connection between said members, said elements comprising cam means responsive to the torque transmitted through said members to disengage said elements from each other; said driving member having a closed chamber provided with a fluid inlet and a fluid outlet; a valve member disposed in said chamber and having a stem extending from said chamber and operatively connected to said driven member, said valve member being acted on by fluid under pressure in said chamber to be urged toward a position closing said outlet and maintaining said clutch elements in driving relation with respect to each other; said valve member being shifted by said driven member to a position opening said outlet upon a predetermined torque being transmitted through said clutch elements to enable said elements to be disengaged from each other.

15. In torque transmitting apparatus: driving and driven members; coengaging clutch elements on said members effecting a rotatable driving connection between said members, said elements comprising cam means responsive to the torque transmitted through said members to disengage said elements from each other; means providing a closed chamber rotatable with one of said members, said chamber having a fluid inlet, a fluid outlet, and a valve seat between said inlet and outlet; a valve head connected to the other of said members to prevent substantial relative axial movement therebetween, said valve member being disposed in said chamber to be acted on by fluid under pressure therewithin to urge said head against said seat to close said outlet and to maintain said clutch elements in driving relation with respect to each other; said valve head being shifted by said other of said members to a position disengaged from said seat upon a predetermined torque being transmitted through said clutch elements to enable said elements to be disengaged from each other.

16. In torque transmitting apparatus: driving and driven members; coengaging clutch elements on said members effecting a rotatable driving connection between said members, said elements comprising cam means responsive to the torque transmitted through said elements to disengage said elements from each other; said driving member having a closed chamber provided with a fluid inlet, a fluid outlet, and a valve seat between said inlet and outlet; a valve head connected to said driven member and disposed in said chamber to be acted on by fluid under pressure therewithin to urge said head into engagement with said seat to close said outlet and maintain said clutch elements in driving relation with respect to each other; said valve head being shifted by said driven member to a position out of engagement from said seat upon a predetermined torque being transmitted through said clutch elements to enable said elements to be disengaged from each other.

17. In torque transmitting apparatus: driving and driven members; coengaging clutch elements on said members effecting a rotatable driving connection between said members, said elements comprising cam means responsive to the torque transmitted through said members to disengage said elements from each other; means providing a closed chamber on one of said members, said chamber having a fluid inlet and a fluid outlet; a valve member connected to the other of said members to prevent substantial relative axial movement therebetween, said valve member being disposed in said chamber to be acted on by fluid under pressure therewithin to close said outlet and to maintain said clutch elements in driving relation with respect to each other; said valve member being shifted by said other of said members to a position opening said outlet upon a predetermined torque being transmitted through said clutch elements to enable said elements to be disengaged from each other; and means providing a swivel connection for conducting fluid under pressure from outside said closed chamber to said inlet.

18. In torque transmitting apparatus: driving and driven members; coengaging clutch elements on said members effecting a rotatable driving connection between said members, said elements comprising cam means responsive to the torque transmitted through said members to disengage said elements from each other; means providing a closed chamber on one of said members, said chamber having a fluid inlet, a fluid outlet, and a cylindrical valve seat between said inlet and outlet; a valve head connected to the other of said members to prevent substantial relative axial movement therebetween and having a generally cylindrical periphery adapted to be disposed in leakproof relation within said cylindrical seat; said valve head being disposed in said chamber to be acted on by fluid under pressure therewithin to urge said valve head into engagement with said seat and to maintain said clutch elements in driving relation with respect to each other; said valve head being shifted by said other of said members to a position out of engagement with said cylindrical seat upon a predetermined torque being transmitted through said clutch elements to enable said elements to be disengaged from each other.

19. In torque transmitting apparatus: driving and driven members; coengaging clutch elements on said members effecting a rotatable driving connection between said members, said elements comprising cam means responsive to the torque transmitted through said members to disengage said elements from each other; said driving member having a closed chamber provided with a fluid inlet, a fluid outlet, and a cylindrical valve seat between said inlet and outlet; a valve head connected to said driven member to move axially therewith and disposed in said chamber, said head being adapted to be acted on by fluid under pressure within said chamber to urge said head into engagement with said seat and to maintain said clutch elements in driving relation with respect to each other; said valve head being shifted by said driven member to a position out of engagement with said cylindrical seat upon a predetermined torque being transmitted through said clutch elements to enable said elements to be disengaged from each other.

20. In torque transmitting apparatus: driving and driven members; coengaging elements on said members effecting a rotatable driving connection between said members, said elements being responsive to the torque transmitted to said members and tending to be disengaged by said torque; fluid operated means exerting a holding force on said elements tending to maintain them in engagement with each other; and magnetic means rotatable with one of said members and exerting a holding force on said elements tending to maintain them in engagement with each other.

21. In torque transmitting apparatus: driving and driven members; coengaging clutch elements on said members effecting a rotatable driving connection between said members, said elements comprising cam means responsive to the torque transmitted through said members to disengage said elements from each other; means providing a closed chamber rotatable with one of said members, said chamber having a fluid inlet and a fluid outlet; a valve member connected to the other of said members to prevent substantial relative axial movement therebetween, said valve member being disposed in said chamber to be acted on by fluid under pressure therewithin to close said outlet and to maintain said clutch elements in driving relation with respect to each other; said valve member being shifted by said other of said members to a position opening said outlet upon a predetermined torque being transmitted through said clutch elements to enable said elements to be disengaged from each other; and means for feeding fluid under pressure from outside of said closed chamber to said fluid inlet.

References Cited in the file of this patent

UNITED STATES PATENTS

| 1,678,634 | Chandler | July 31, 1928 |
| 2,293,786 | Worden | Aug. 25, 1942 |
| 2,299,956 | Stever | Oct. 27, 1942 |
| 2,683,512 | Boice | Jan. 13, 1954 |
| 2,741,352 | Stevens et al. | Apr. 10, 1956 |